United States Patent
Wybenga et al.

(10) Patent No.: US 7,366,167 B2
(45) Date of Patent: Apr. 29, 2008

(54) APPARATUS AND METHOD FOR HAIRPINNING DATA PACKETS IN AN ETHERNET MAC CHIP

(75) Inventors: Jack C. Wybenga, Plano, TX (US);
Patricia K. Sturm, Dallas, TX (US);
Steven E. Tharp, Garland, TX (US);
Youngil Kim, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 949 days.

(21) Appl. No.: 10/665,832

(22) Filed: Sep. 19, 2003

(65) Prior Publication Data

US 2005/0063375 A1    Mar. 24, 2005

(51) Int. Cl.
*H04L 12/66* (2006.01)
*H04J 3/16* (2006.01)
*H04J 3/22* (2006.01)
*G06F 15/173* (2006.01)

(52) U.S. Cl. .................... 370/386; 370/352; 370/465; 709/238

(58) Field of Classification Search ........ 370/338–389, 370/395–401, 410–428, 469–474; 709/224–232
See application file for complete search history.

(56) References Cited

U.S. PATENT DOCUMENTS

| | | | |
|---|---|---|---|
| 6,137,804 A * | 10/2000 | Allison et al. | 370/410 |
| 6,879,598 B2 * | 4/2005 | Zancan et al. | 370/463 |
| 7,031,320 B2 * | 4/2006 | Choe | 370/395.31 |
| 7,233,597 B2 * | 6/2007 | Kumar et al. | 370/401 |
| 2002/0126672 A1 * | 9/2002 | Chow et al. | 370/392 |
| 2003/0067925 A1 * | 4/2003 | Choe et al. | 370/400 |
| 2004/0111426 A1 * | 6/2004 | Kim et al. | 707/100 |
| 2004/0114518 A1 * | 6/2004 | MacFaden et al. | 370/230.1 |
| 2004/0153573 A1 * | 8/2004 | Kim et al. | 709/242 |
| 2004/0264488 A1 * | 12/2004 | Yoon et al. | 370/412 |
| 2005/0044249 A1 * | 2/2005 | Teng et al. | 709/230 |

\* cited by examiner

*Primary Examiner*—Man U. Phan

(57) ABSTRACT

A router for interconnecting N interfacing peripheral devices. The router comprises routing nodes coupled to one another via switching circuitry. A first routing nodes comprises: 1) a physical medium device (PMD) module for transmitting data packets to and receiving data packets from the N interfacing peripheral devices; 2) an ingress processor for receiving incoming data packets from the PMD module; 3) an egress processor for transmitting data packets to the PMD module; and 4) a medium access control (MAC) processor for forwarding data packets from the ingress processor to the switching circuitry and forwarding data packets from the switching circuitry to the egress processor. The MAC processor determines whether a first data packet received from the ingress processor is directed to the egress processor and, if so, transfers the first data packet directly to the egress processor without forwarding the first data packet through the switching circuitry.

15 Claims, 3 Drawing Sheets

APPARATUS AND METHOD FOR HAIRPINNING DATA PACKETS IN AN ETHERNET MAC CHIP

TECHNICAL FIELD OF THE INVENTION

The present invention relates to massively parallel routers and, more specifically, to a massively parallel, distributed architecture router that transfers data between an ingress processor and an egress processor in the same routing node.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of a new generation of massively parallel, distributed architecture routers. A distributed architecture router typically comprises a large number of routing nodes that are coupled to a high-bandwidth crossbar switch via a plurality of switch fabric modules. Each routing node has its own routing (or forwarding) table for forwarding data packets via other routing nodes to a destination address.

In a conventional 1 Gigabit Ethernet (GbE) router, each routing node uses a network processor (NP) that performs routing functions for both incoming (ingress) and outgoing (egress) data packets. A 1 GbE network processor typically uses micro-engines that forward data packets, both within the same routing node as well as to other routing nodes via the switch fabrics.

The single network processor arrangement is particularly advantageous for "hairpinning" a received data packet. If a routing node receives a data packet from an external source device, and both the source device and the destination device are coupled to the routing node via the physical media device (PMD) modules of the routing node, there is no need to transfer the data packet through the switch fabrics and/or cross-bar switch associated with the routing node. Instead, the micro-engines of the network processor simply transmit the received data packet back out through the PMD modules (i.e., like a "hairpin" turn) without using the switch fabrics.

However, the single network processor approach cannot keep up with the 10 Gbps data rate of newer 10 Gigabit Ethernet (GbE) routers. As a result, 10 GbE routers use two network processors, an ingress processor for routing incoming data packets received from a PMD module and an egress processor for routing outgoing data packets received from the switch fabric and/or cross-bar switch. Use of two network processors allows higher data rates, but also requires a different approach to hair-pinning data packets, since the micro-engines in the two processors are not handling both the incoming and the outgoing data packets.

An alternative way to hairpin data packets is to let the control plane processors forward the data packets between the network processors within the routing node. However, using a single processor to handle data packets and to perform control plane functions can only be used with very low speed routers. In fact, using a central processor for data plane and control plane functionality is even worse in terms of the data rates supported than a single network processor in a 1 GbE router configuration.

A new data plane interface could be added between the micro-engines in the egress and ingress network processors to allow the micro-engines of the two network processors to forward packets directly to the other network processor. However, using a new high-speed data interface between the micro-engines of the two network processors is impractical, as there is no convenient place to connect the new interface to the micro-engines. In essence, this approach requires added hardware and complexity, which leads to circuit board problems associated with higher speed interfaces.

Finally, the switch fabric modules could be used to allow loop-backs of data packets during normal operations. However, conventional switch fabrics do not provide this feature. Modification of the switch fabric is possible, but has the disadvantage of requiring a switch module even with a single routing node system. In addition, it has the disadvantage of shipping all of the data back and forth over the optical links, adding to the delays and optical traffic.

Therefore, there is a need in the art for an improved high-speed router. In particular, there is a need for a high bandwidth mechanism for routing (or hairpinning) data packets between the ingress and egress network processors within the same routing node.

SUMMARY OF THE INVENTION

The present invention comprises a distributed router having multiple routing nodes interconnected by switch fabric modules and an optional backbone crossbar switch. To handle the high-speed interfaces of 10 Gbps routing nodes, the present invention uses separate network processors to handle ingress and egress packets. For packets that are routed between two ports of the same routing node, the present invention uses a modified Media Access Control (MAC) chip that allows data packets to flow between the two network processors, in addition to the normal flow of packets to the switch fabric. The MAC device is modified to provide additional internal interfaces to send packets between the two network processors. These interfaces are internal to the MAC chip. This reduces board layout problems associated with an added high-speed interface.

Modifying the MAC device in this manner ensures that the functionality for hairpinning data packets stays in the routing node and does not involve the switch fabrics. The present invention can therefore support hairpinning at the full 10 Gbps data rate and allows a single routing node to operate without using the switch fabric. Advantageously, the present invention uses existing interfaces and parts and reduces complexity relative to the alternative of supporting an additional interface.

To address the above-discussed deficiencies of the prior art, it is a primary object of the present invention to provide a router for interconnecting N interfacing peripheral devices. According to an advantageous embodiment, the router comprises a plurality of routing nodes coupled to one another via switching circuitry. A first one of the plurality of routing nodes comprises: 1) at least one physical medium device (PMD) module capable of transmitting data packets to and receiving data packets from selected ones of the N interfacing peripheral devices; 2) an ingress processor capable of receiving incoming data packets from the at least one PMD module; 3) an egress processor capable of transmitting data packets to the at least one PMD module; and 4) a medium access control (MAC) processor capable of forwarding data packets from the ingress processor to the switching circuitry and forwarding data packets from the switching circuitry to the egress processor, wherein the MAC processor is capable of determining whether a first data packet received from the ingress processor is directed to the egress processor and, in response to the determination, transferring the first data packet directly to the egress processor without forwarding the first data packet through the switching circuitry.

According to one embodiment of the present invention, the MAC processor determines whether the first data packet is directed to the egress processor by an address of the first data packet.

According to another embodiment of the present invention, the MAC processor determines that the first data packet is directed to the egress processor if the address of the first data packet matches an address of the MAC processor.

According to still another embodiment of the present invention, the MAC processor forwards the first data packet to the switching circuitry if the address of the first data packet does not match the address of the MAC processor.

According to yet another embodiment of the present invention, the MAC processor comprises a field programmable gate array.

According to a further embodiment of the present invention, the MAC processor comprises a transmit state machine capable of determining whether the first data packet is directed to the egress processor.

According to a still further embodiment of the present invention, the MAC processor comprises a receive state machine coupled to the transmit state machine capable of receiving the first data packet from the transmit state machine if the transmit state machine determines the first data packet is directed to the egress processor.

According to a yet further embodiment of the present invention, the receive state machine forwards the first data packet from the transmit state machine to the egress processor.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed router.

Figure 1:
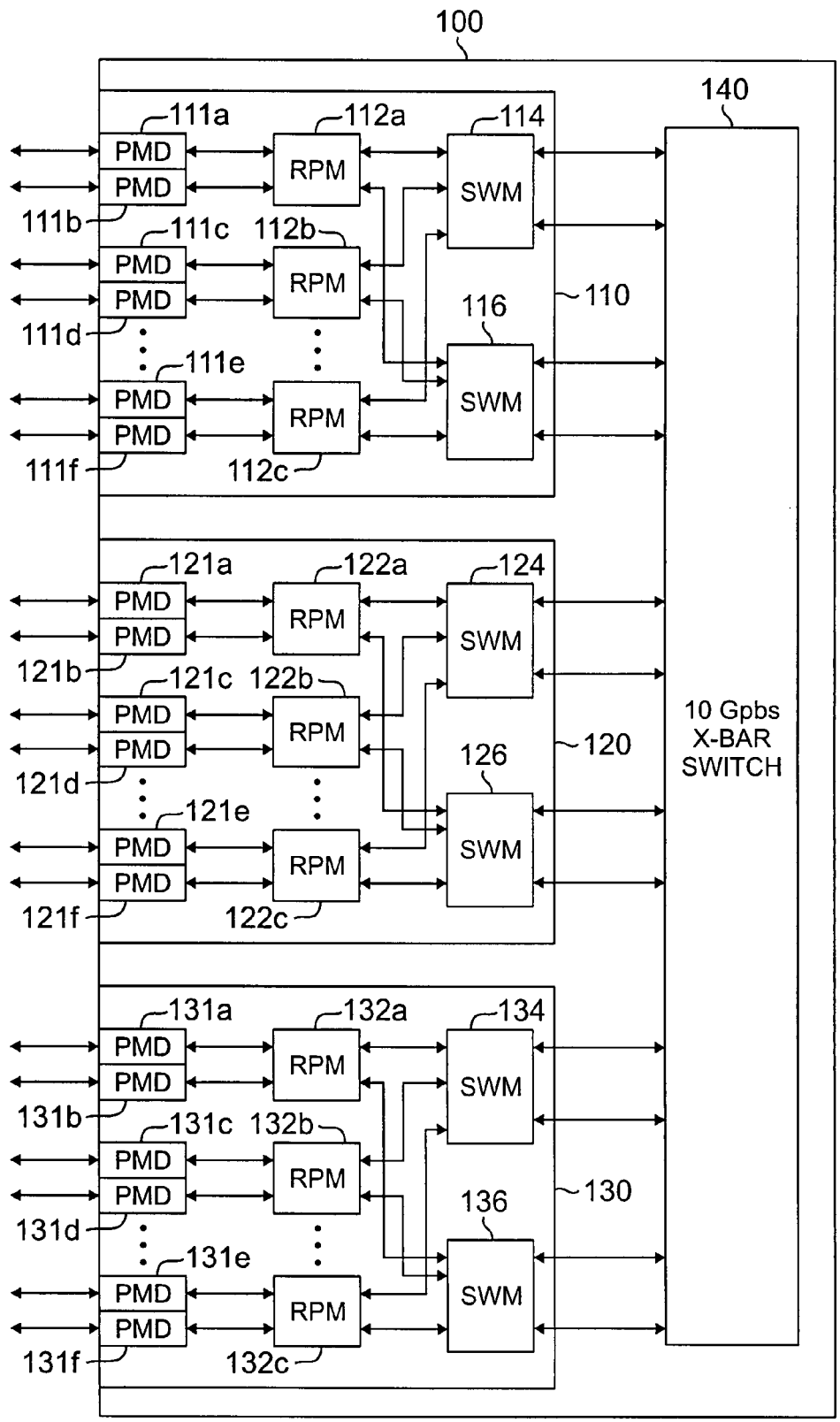
FIG. 1 illustrates an exemplary distributed architecture router that implements a MAC device that sends data packets between two network processors according to the principles of the present invention.

FIG. 1 illustrates exemplary distributed architecture router 100, which implements a MAC device that sends data packets between two network processors according to the principles of the present invention. According to the exemplary embodiment, router 100 comprises a plurality of rack-mounted shelves, including exemplary shelves 110, 120 and 130, that are coupled via crossbar switch 140. In an advantageous embodiment, crossbar switch is a 10 Gigabit Ethernet (10 GbE) crossbar operating at 10 gigabits per second (Gbps).

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, a plurality of route processing modules 132, including RPM 132a, RPM 132b, and RPM 132c, and a plurality of physical media device (PMD) modules 131, including PMD modules 131a-131f. Each PMD module 131 transmits and receives data packets via a plurality of data lines connected to each PMD module 131.

Router 100 provides scalability and high-performance using up to M independent routing nodes (RN). Each routing node comprises a route processing module (RPM) and at least one physical medium device (PMD) module. Each route processing module buffers incoming Internet protocol (IP) frames and MPLS frames from subnets or adjacent routers. Additionally, each RPM classifies requested services, looks up destination addresses from frame headers or data fields, and forwards frames to the outbound RPM. Moreover, each RPM also maintains an internal routing table determined from routing protocol messages and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs bus conversion functions.

Incoming data packets may be forwarded within router 100 in a number of different ways, depending on whether the source and destination ports are associated with the same or different PMD modules, the same or different route processing modules, and the same or different switch modules. Since each RPM is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 140 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 140, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 140 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route processing module (i.e., RPM 112a). The data packet still must be forwarded to RPM 112a, but does not need to be forwarded to crossbar switch 140 or to switch modules 114 and 116.

Figure 2:
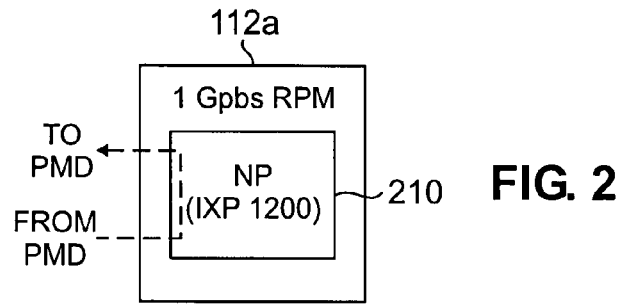
FIG. 2 illustrates the hairpinning of data packets in a routing node containing a single network processor.

The third and fourth cases described above are ideal situations for hairpinning data packets in the route processing modules, since the data packets do not need to be forwarded to the switch modules or the crossbar switch. FIG. 2 illustrates the hairpinning of data packets in route processing module 112a, which contains a single network processor (NP). In the exemplary embodiment, RPM 112a operates at 1 gigabit per second (1 Gbps) and network processor (NP) 210 is an IXP 1200 processor. At this speed, an IXP 1200 processor is capable of hairpinning data packets, as shown by the dotted line, using the internal micro-engines of the IXP 1200. The micro-engines simply transmit the received data packet back through the PMD modules without using the switch modules or the crossbar switch.

Figure 3:
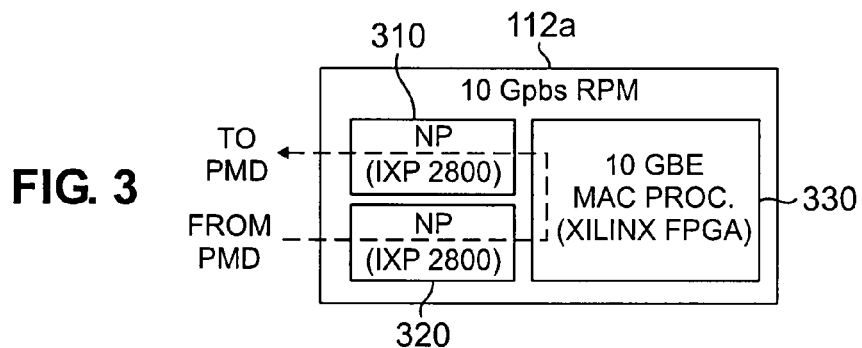
FIG. 3 illustrates the hairpinning of data packets in a routing node containing two network processors according to one embodiment of the present invention.

However, the configuration in FIG. 2 is inadequate for the speeds in a 10 Gigabit Ethernet router. FIG. 3 illustrates the hairpinning of data packets in route processing node 112a, which contains two network processors according to an exemplary embodiment of the present invention. Route processing module (RPM) 112a comprises egress network processor (NP) 310, ingress network processor (NP) 320, and medium access control (MAC) processor 330.

In the exemplary embodiment, RPM 112a operates at 10 gigabit per second (10 Gbps). Ingress network processor (NP) 320 is, for example, an IXP 2800 processor that receives data packets from the PMD modules and forwards the received data packets to MAC processor 330. Egress network processor (NP) 310 is an IXP 2800 processor that receives data packets from MAC processor 330 and forwards the received data packets to the PMD modules. In the exemplary embodiment, MAC processor 330 may comprise a Xilinx field programmable array (FPGA).

Figure 4:
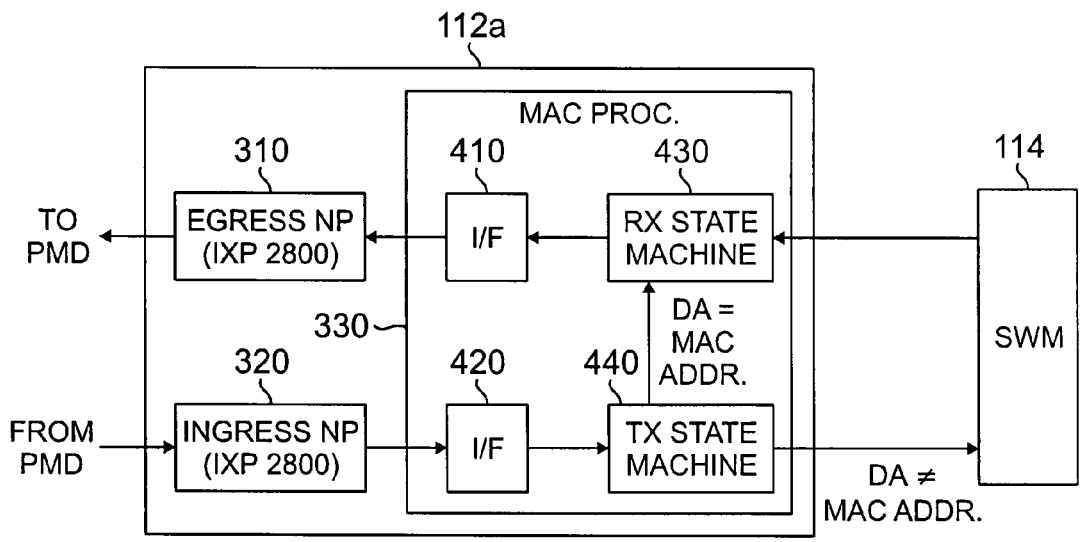
FIG. 4 illustrates in greater detail the medium access control (MAC) processor in the routing node in FIG. 3 according to one embodiment of the present invention.

FIG. 4 illustrates medium access control (MAC) processor 330 in route processing module 112a according to the principles of the present invention. MAC processor 330 comprises output interface (IF) 410, input interface (IF) 420, receive (RX) state machine 430 and transmit (TX) state machine 440. Input IF 420 buffers incoming data packets from the PMD modules and output IF 410 buffers outgoing data packets being sent to the PMD modules. The present invention provides a mechanism by which TX state machine 440 compares the destination address (DA) of the data packet to the MAC address of MAC processor 330. If the destination address is not equal to the MAC address, TX state machine 440 forwards the data packet to the switching module. If the destination address is equal to the MAC address, TX state machine 440 forwards the data packet to the RX state machine 430.

Figure 5:
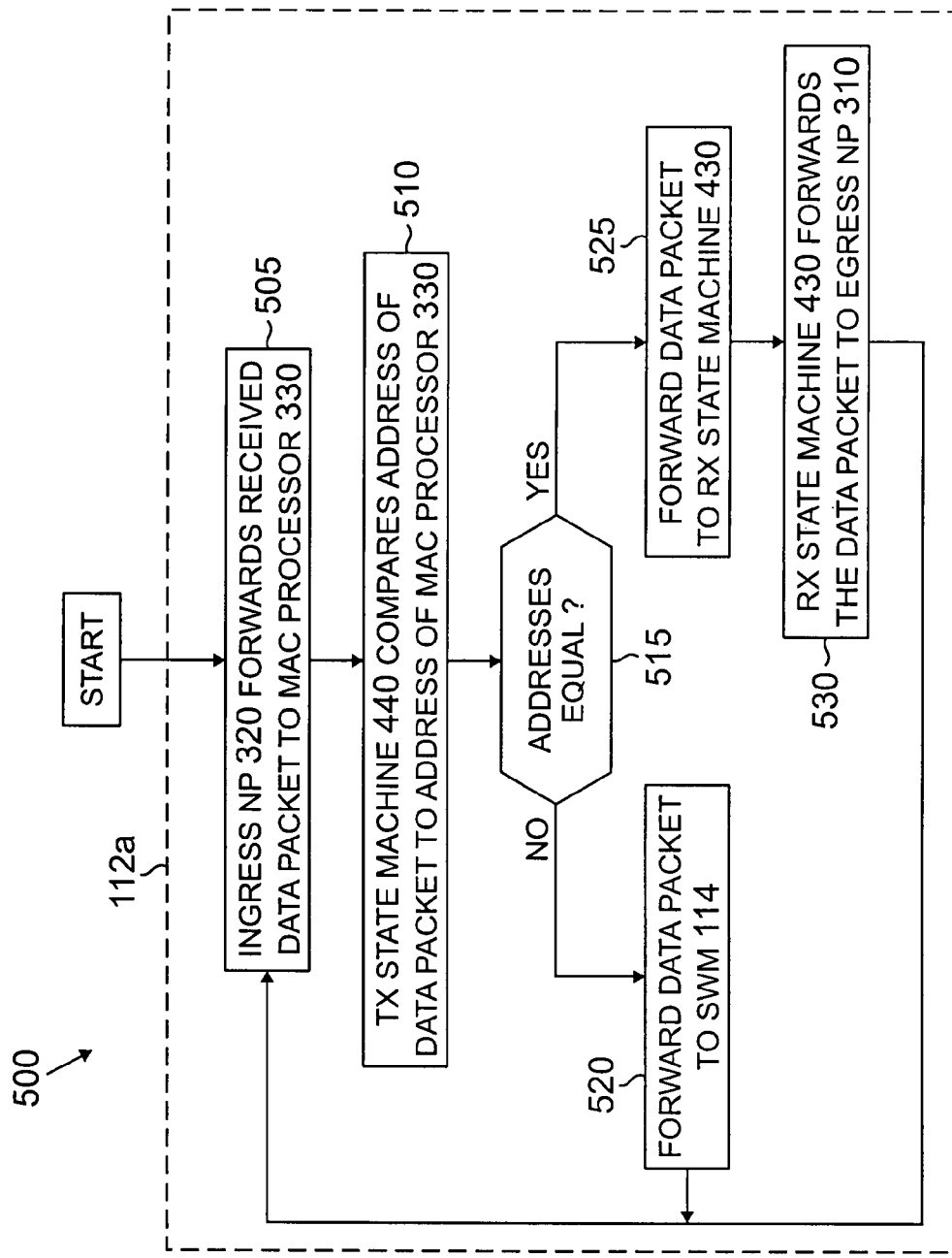
FIG. 5 is a flow diagram illustrating the hair-pinning of a data packet in a routing node according to the principles of the present invention.

FIG. 5 depicts flow diagram 500, which illustrates the hair-pinning of a data packet according to the principles of the present invention. Initially, ingress network processor (NP) 320 forwards the received data packet to medium access control (MAC) processor 330 (process step 505). Next, transmit (TX) state machine 440 compares the address of the data packet to the address of MAC processor 330 (process step 510). If the addresses are not equal, TX state machine 440 forwards the data packet to switch module (SWM) 114 (process steps 515 and 520). If the addresses are equal, TX state machine 440 forwards the data packet to RX state machine 430 (process steps 515 and 525). Finally, RX state machine 430 forwards the data packet to egress network processor (NP) 310 (process step 530).

Although the present invention has been described with an exemplary embodiment, various changes and modifications may be suggested to one skilled in the art. It is intended that the present invention encompass such changes and modifications as fall within the scope of the appended claims.

What is claimed is:

1. A router for interconnecting N interfacing peripheral devices, said router comprising a plurality of routing nodes coupled to one another via switching circuitry, a first one of said plurality of routing nodes comprising:

at least one physical medium device (PMD) module capable of transmitting data packets to and receiving data packets from selected ones of said N interfacing peripheral devices;

an ingress processor capable of receiving incoming data packets from said at least one PMD module;

an egress processor capable of transmitting data packets to said at least one PMD module; and a medium access control (MAC) processor capable of forwarding data packets from said ingress processor to said switching circuitry and forwarding data packets from said switching circuitry to said egress processor, wherein said MAC processor is capable of determining whether a first data packet received from said ingress processor is directed to said egress processor and, in response to said determination, transferring said first data packet directly to said egress processor without forwarding said first data packet through said switching circuitry, wherein said MAC processor determines that said first data packet is directed to said egress processor if said address of said first data packet matches an address of said MAC processor.

2. The router as set forth in claim 1 wherein said MAC processor forwards said first data packet to said switching circuitry if said address of said first data packet does not match said address of said MAC processor.

3. The router as set forth in claim 2 wherein said MAC processor comprises a field programmable gate array.

4. The router as set forth in claim 3 wherein said MAC processor comprises a transmit state machine capable of capable of determining whether said first data packet is directed to said egress processor.

5. The router as set forth in claim 4 wherein said MAC processor comprises a receive state machine coupled to said transmit state machine capable of receiving said first data packet from said transmit state machine if said transmit state machine determines said first data packet is directed to said egress processor.

6. The router as set forth in claim 5 wherein said receive state machine forwards said first data packet from said transmit state machine to said egress processor.

7. A communication network comprising a plurality of routers that communicate data packets to one another and to interfacing peripheral devices, each router comprising a plurality of routing nodes coupled to one another via switching circuitry, wherein a first one of said plurality of routing nodes comprises:

a physical medium device (PMD) module capable of transmitting data packets to and receiving data packets from external devices;

an ingress processor capable of receiving incoming data packets from said PMD module;

an egress processor capable of transmitting data packets to said PMID module; and a medium access control (MAC) processor for forwarding data packets from said ingress processor to said switching circuitry and forwarding data packets from said switching circuitry to said egress processor, wherein said MAC processor determines whether a first data packet received from said ingress processor is directed to said egress processor and, in response to said determination, transfers said first data packet to said egress processor without forwarding said first data packet through said switching circuitry, wherein said MAC processor determines that said first data packet is directed to said egress processor if said address of said first data packet matches an address of said MAC processor.

8. The communication network as set forth in claim 7 wherein said MAC processor forwards said first data packet to said switching circuitry if said address of said first data packet does not match said address of said MAC processor.

9. The communication network as set forth in claim 8 wherein said MAC processor comprises a field programmable gate array.

10. The communication network as set forth in claim 9 wherein said MAC processor comprises a transmit state machine capable of capable of determining whether said first data packet is directed to said egress processor.

11. The communication network as set forth in claim 10 wherein said MAC processor comprises a receive state machine coupled to said transmit state machine capable of receiving said first data packet from said transmit state machine if said transmit state machine determines said first data packet is directed to said egress processor.

12. The communication network as set forth in claim 11 wherein said receive state machine forwards said first data packet from said transmit state machine to said egress processor.

13. For use in a router comprising a plurality of routing nodes coupled to one another via switching circuitry, a method of forwarding data packets comprising the steps of:

receiving in an ingress processor a first data packet from an external device;

forwarding the received first data packet to a medium access control (MAC) processor capable of forwarding data packets from the ingress processor to the switching circuitry;

determining in the MAC processor whether the first data packet received from the ingress processor is directed to an egress processor associated with the MAC processor; and in response to a determination that the first data packet is directed to the egress processor, transferring the first data packet directly to the egress processor without forwarding the first data packet through the switching circuitry, wherein the step of determining whether the first data packet received from the ingress processor is directed to the egress processor comprises the step of determining whether an address of the first data packet matches an address of the MAC processor.

14. The method as set forth in claim 13 further comprising the step of forwarding the first data packet to the switching circuitry if the address of the first data packet does not match the address of the MAC processor.

15. The method as set forth in claim 14 wherein the step of transferring the first data packet directly to the egress processor comprises the sub-step of forwarding the first data packet to the egress processor if the address of the first data packet matches the address of the MAC processor.

* * * * *

UNITED STATES PATENT AND TRADEMARK OFFICE
CERTIFICATE OF CORRECTION

PATENT NO. : 7,366,167 B2 Page 1 of 1
APPLICATION NO. : 10/665832
DATED : April 29, 2008
INVENTOR(S) : Jack C. Wybenga et al.

It is certified that error appears in the above-identified patent and that said Letters Patent is hereby corrected as shown below:

Column 8, claim 10, line 17, delete "capable of" (second occurrence).

Signed and Sealed this

Twenty-second Day of December, 2009

David J. Kappos
*Director of the United States Patent and Trademark Office*